(12) United States Patent
Takemori et al.

(10) Patent No.: US 6,850,026 B2
(45) Date of Patent: Feb. 1, 2005

(54) STEPPING MOTOR DRIVER

(75) Inventors: Akio Takemori, Kiryu (JP); Yoshifumi Kuwano, Kiryu (JP); Yukinari Takahashi, Kiryu (JP); Hiroaki Taka, Kiryu (JP)

(73) Assignee: Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 10/379,736

(22) Filed: Mar. 6, 2003

(65) Prior Publication Data

US 2003/0173929 A1 Sep. 18, 2003

(30) Foreign Application Priority Data

Mar. 15, 2002 (JP) ........................................ 2002-071405
Sep. 30, 2002 (JP) ........................................ 2002-284804
Dec. 25, 2002 (JP) ........................................ 2002-373571
Dec. 25, 2002 (JP) ........................................ 2002-373593

(51) Int. Cl.$^7$ ............................................... H02P 8/22
(52) U.S. Cl. ........................................ 318/685; 318/696
(58) Field of Search ................................ 318/685, 696, 318/138, 254, 687, 439; 310/171

(56) References Cited

U.S. PATENT DOCUMENTS

| | | | | |
|---|---|---|---|---|
| 4,426,608 A | * | 1/1984 | Larson et al. ................ | 318/685 |
| 4,536,691 A | * | 8/1985 | Sakakibara .................. | 318/696 |
| 4,818,908 A | * | 4/1989 | Tamae et al. ................ | 310/171 |
| 4,949,027 A | * | 8/1990 | Baur ........................... | 318/696 |
| 5,729,102 A | * | 3/1998 | Gotou et al. ................. | 318/254 |
| 5,969,496 A | * | 10/1999 | Yamada et al. ............. | 318/715 |
| 6,097,522 A | * | 8/2000 | Maerki et al. ............... | 398/122 |
| 2002/0024828 A1 | * | 2/2002 | Hayashi et al. .............. | 363/35 |
| 2003/0090262 A1 | * | 5/2003 | Ho .............................. | 324/207.12 |
| 2003/0178965 A1 | * | 9/2003 | Kuwano et al. ............. | 318/685 |
| 2003/0198065 A1 | * | 10/2003 | Hayashi et al. .............. | 363/35 |

OTHER PUBLICATIONS

Okumatsu, Yoshihiro, et al. Proc., No. 110, Industrial Application Branch, Japan Society of Electric Engineering, 2001 (p. 659, second volume).
Grimbleby, J.B. IEEE Proc.–Electr. Power Appl. vol. 142, No. 1, pp. 5–13, Jan. 1995.

* cited by examiner

*Primary Examiner*—Paul Ip
(74) *Attorney, Agent, or Firm*—Birch, Stewart, Kolasch & Birch, LLP (57) ABSTRACT

The stepping motor driver comprises an angle computing element that receives rotor position detection signals from an encoder and calculates a detected angle representing the rotational angle of the rotor, and a lead angle controller that generates a corrected command angle based on the difference between a command angle given from outside and the detected angle. The lead angle controller calculates an angle deviation that is the difference between the command angle and the detected angle, compares the angle deviation with a predetermined value, outputs the command angle as the corrected command angle if the angle deviation is less than the predetermined value, and outputs a value obtained by adding an approximated lead angle to the detected angle as the corrected command angle if the angle deviation is greater than, or equal to, the predetermined value, and the phase of voltage applied to the motor is controlled according to the corrected command angle.

5 Claims, 5 Drawing Sheets

STEPPING MOTOR DRIVER

BACKGROUND OF THE INVENTION

1. Field of the Invention

The present invention concerns a stepping motor driver for controlling rotational angular position and rotational speed of a rotor of a stepping motor.

2. Description of the Prior Art

With the high functionalization of systems equipped with motors, motors of which vibration levels are low, and of which rotational speed ranges are wide, are being demanded. Since a stepping motor is caused to make a stepping rotation by changing instantaneously an excitation current for a winding at each time when a set of external command pulses is given, there have been problems that the stepping motor causes vibration and that it tends to step-out when the excitation current is changed.

To lower the vibration level of a stepping motor, a micro-step excitation system in which an inverter of a PWM (pulse width modulation) type is used to smoothly change excitation currents for windings is being generally used. In this case, the excitation currents for the windings are repeatedly changed without delays in accordance with command pulses, and a rotor of the stepping motor rotates following the change of the excitation currents for windings. Also in this case, however, the stepping-out can not be completely avoided, since the excitation currents are applied to the windings independently of the rotational angular position of the rotor.

In order to solve such problems, there is proposed a control system in which an angle detector for detecting rotational angular position of a rotor is provided and the stepping-out is prevented by properly setting an excitation condition at a stepping-out boundary.

A stepping motor controller in which excitation angle is controlled to prevent a stepping-out is disclosed in, for example, IEE Proc.-Electr. Power Appl., Vol. 142, No. 1, January 1995 (hereinafter referred to as prior art 1). According to the stepping motor controller disclosed in the prior art 1, an incremental encoder is used to detect angular position of a rotor, the stepping motor is normally operated by an open-loop control, excitation timing is varied according to an angle deviation that is the difference between a command angle given by a set of command pulses and a rotational angle of the rotor detected by the encoder, and the stepping motor can be operated without stepping-out even at a high speed.

This stepping motor driver comprises;

- an encoder for detecting rotational angle of a rotor,
- a command and feedback signal receiver that receives angle command signals from outside and the detected angle signals from the encoder,
- a speed discriminator that receives outputs of the command and feedback signal receiver and discriminates speed of the rotor,
- an angle deviation counter that receives outputs of the command and feedback signal receiver and counts the angle deviations,
- a control algorithm implementation part that receives outputs of the command and feedback signal receiver, outputs of the speed discriminator and outputs of the angle deviation counter, and that carries out control algorithm,
- a pulse signal generator that receives outputs of the control algorithm implementation part and generates pulse signals, and
- a torque signal generator that receives pulse signals from the pulse signal generator and controls motor dynamics of the stepping motor.

In this stepping motor driver, anticipating that a motor excitation current is delayed with respect to the applied voltage due to the winding inductance, motor excitation timing is advanced to the command angle, and a stable control system of a simple structure is realized. That is, an angle command signal $\theta^*$ is used without change as the excitation signal as long as the stepping motor remains synchronized, whereas an excitation condition is determined taking rotational angle of the rotor into consideration when synchronization is lost or going to be lost. Thus, stepping-out is prevented by changing the excitation criterion. The condition for the change of the excitation is obtained by an experiment in which the maximum torque generating condition to the rotor speed for a given lead angle is determined.

In the meantime, a proper lead angle $\gamma$ for a stepping motor that is a kind of synchronous motor can be determined by an equation (1) as follows based on a voltage equation.

$$\gamma = \tan^{-1}\{(\omega_{re}L)/R\} + \sin^{-1}\{(Zi_q)/V + (RE_{emf})/(Z\,V)\} \quad (1)$$

where $\gamma$ is the lead angle, $\omega_{re}$ is a rotational angular (in electrical angle) frequency (current fundamental frequency) of the motor, L is an inductance of a winding of the motor, R is a resistance of the winding of the motor, Z is an impedance of the winding of the motor, $i_q$ is a q-axis component of a current in the winding of the motor (hereinafter referred to as q-axis current), V is a voltage applied to the motor, and $E_{emf}$ is a speed electromotive force.

Now, how equation (1) is obtained is explained.

Expressing a d-axis component of the voltage applied to the motor by $v_d$, a q-axis component of the voltage applied to the motor by $v_q$, a magnitude of the current in the winding of the motor by I, and a d-axis component of the current in the winding of the motor (hereinafter referred to as d-axis current) by $i_d$, relations expressed by equations (2) and (3) are composed.

$$V = (v_d^2 + v_q^2)^{1/2} \quad (2)$$

$$I = (i_d^2 + i_q^2)^{1/2} \quad (3)$$

Voltage equation for $v_d$ and $v_q$ is expressed by an equation (4) as follows.

$$\begin{bmatrix} v_d \\ v_q \end{bmatrix} = \begin{bmatrix} R + pL_d & -\omega_{re}L_q \\ \omega_{re}L_d & R + pL_q \end{bmatrix} \begin{bmatrix} i_d \\ i_q \end{bmatrix} + \omega_{re}\Phi_m \begin{bmatrix} 0 \\ 1 \end{bmatrix} \quad (4)$$

where p is a differential operator, $L_d$ is a d-axis component of the inductance of the winding, $L_q$ is a q-axis component of the inductance of the winding, $\omega_{re}$ is a rotational angular frequency of the rotor of the motor, and $\Phi_m$ is a magnetic flux of the motor.

Here, assuming $pL_d = pL_q = 0$, and $R \ll \omega_{re}L$ in a steady condition at a high rotational speed, the equation (4) is approximated and equations (5) and (6) as follows are obtained.

$$v_d = -\omega_{re}L_q i_q \quad (5)$$

$$v_q = \omega_{re}L_d i_d + \omega_{re}\Phi_m \quad (6)$$

Using $v_d$ and $v_q$ in the equations (5) and (6) for $v_d$ and $v_q$ in the equations (2) and (3), all equation (7) as follows is obtained.

$$V^2 = (-\omega_{re}L_q i_q)^2 + (\omega_{re}L_d i_d + \omega_{re}\Phi_m)^2 \quad (7)$$

In the equation (7), the maximum voltage applied to the motor is normally less than a source voltage $V_o$ that is normally constant. Additionally, $\omega_{re}\Phi_m$ equals a speed electromotive force $E_{emf}$.

Figure 8:
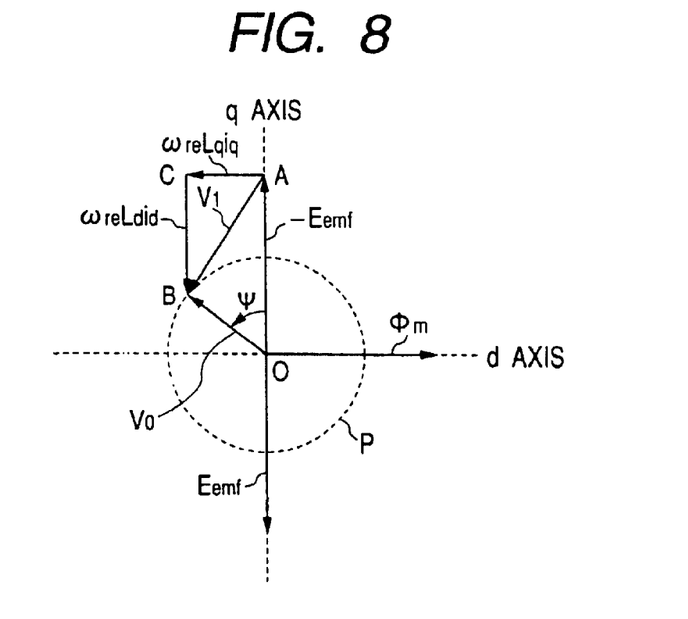
FIG. 8 is a diagram for explaining a relation among internal voltages of a motor.

FIG. 8 shows a relation among internal voltages of a motor in the equation (7), when $\omega_{re}\Phi_m > V_o$. As shown in FIG. 8, the magnitude of the voltage $V(=V_o)$ applied to the motor equals a resultant vector OB of a vector AC in the direction of the d-axis that is a reactance drop $\omega_{re}L_q i_q$, a vector CB in the direction of the q-axis that is a reactance drop $\omega_{re}L_d i_d$, and a vector OA in the direction of the q-axis that is a back speed electromotive force $-\omega_{re}\Phi_m = -E_{emf}$. A circle P shows a circle having a radius $V_o$. FIG. 8 shows that a motor can be driven even at a rotational speed at which a speed electromotive force $E_{emf}$ exceeds a source voltage $V_o$ by controlling a phase of a voltage applied to the motor.

In a steady condition at a high rotational speed, $pL_d = pL_q = 0$, and the equation (4) can be approximated into an equation (8) as follows.

$$\begin{bmatrix} V_d \\ V_q \end{bmatrix} = \begin{bmatrix} R & -\omega_{re}L \\ \omega_{re}L & R \end{bmatrix} \begin{bmatrix} i_d \\ i_q \end{bmatrix} + \omega_{re}\Phi_m \begin{bmatrix} 0 \\ 1 \end{bmatrix} \quad (8)$$

From the equation (8), the q axis current $i_q$ is obtained by the following equation (9)

$$i_q = (V/Z)\sin(\gamma - \phi) - (R/Z^2)\omega_{re}\Phi_m \quad (9)$$

where the following are assumed;

$$v_d = V \cos \gamma \quad (10)$$

$$v_q = V \sin \gamma \quad (11)$$

$$L_d = L_q = L \quad (12)$$

$$Z = R + j\omega_{re}L \quad (13)$$

and $$\phi = \tan^{-1}(\omega_{re}L/R) \quad (14)$$

Further, assuming that a torque generated by a motor is in proportion to $i_q$, then, $$T = k_t i_q \quad (15)$$
$$= \{(k_t V)/Z\}\sin(\gamma - \phi) - (k_t / Z^2) R \omega_{re}\Phi_m$$

where $k_t$ is a proportional constant.

Thus, an equation (16) expressing an lead angle $\gamma$, corresponding to the above equation (1), is obtained.

$$\gamma = \phi + \sin^{-1}\{(ZT)/(k_t V) + [R/(ZV)]\omega_{re}\Phi_m\} \quad (16)$$
$$= \tan^{-1}\{(\omega_{re}L)/R\} + \sin^{-1}\{(Zi_q)/V + [R/(ZV)]\omega_{re}\Phi_m\}$$
$$= \tan^{-1}\{(\omega_{re}L)/R\} + \sin^{-1}\{(Zi_q)/V + (RE_{emf})/(ZV)\}$$

Since the resistance R and the inductance L of the winding of the motor are regarded to be known values, the lead angle $\gamma$ can be determined from the q-axis current $i_q$ and the rotational angular frequency $\omega_{re}$ of the motor, using the above equation.

By giving the lead angle $\gamma$ according to the equation (1) or (16), a stepping motor can be maintained at an equilibrium condition to a torque at an arbitrary rotational speed. That is, by controlling the lead angle $\gamma$, a stepping motor can be rotationally controlled to a high speed region without stepping-out.

A stepping motor driver, in which a computing element computes the lead angle $\gamma$ using the equation (1) from a command angle $\theta^*$ and a detected angle $\theta_f$, is disclosed in Proc., No.110, Industrial Application Branch, Japan Society of Electric Engineering, 2001 (p. 659, second volume) (hereinafter referred to as prior art 2). In this stepping motor driver, the command angle $\theta^*$ is given from the outside, whereas the detected angle $\theta_f$ is obtained by converting signals transmitted from an encoder connected to a rotor axis of the stepping motor into a rotational angle of the motor.

This stepping motor driver comprises;

a computing element that computes the lead angle $\gamma$ from a command angle $\theta^*$ given from the outside and a detected angle $\theta_f$ obtained by converting signals transmitted from an encoder connected to a rotor axis of the stepping motor into a rotational angle of the motor, current detectors that detect current values $i_{\alpha f}$, $i_{\beta f}$ in the windings of the motor, a first coordinate transformer that transforms the current values in $i_{\alpha f}$, $i_{\beta f}$ into current values $i_{df}$, $i_{qf}$ in a rotational coordinate system, a subtractor that obtains a current deviation that is the difference between a command current value $i_d^*$ given from outside and the current values $i_{df}$, both in the rotational coordinate system, another subtractor that obtains another current deviation that is the difference between a command current value $i_q^*$ given from the outside and the current value $i_{qf}$, both in the rotational coordinate system, current controllers that amplify the current deviations, a second coordinate transformer that receives outputs of the computing element and outputs of the current controllers, and transforms the amplified current deviations in the rotational coordinate system into values in the fixed coordinate system, and a PWM inverter that receives outputs of the second coordinate transformer, and generates applied voltage to windings of the stepping motor for rotating the stepping motor.

Thus, in the stepping motor driver disclosed in the prior art 2, a lead angle control using the equation (1) by the computing element can be made. However, since the lead angle $\gamma$ is controlled in accordance with changes in the load torque, it is necessary to detect the load torque or the q-axis current $i_q$ (load torque current) required for generating the load torque.

Accordingly, there is a problem that the computing of the lead angle is complicated and, accordingly, the system for computing the lead angle is expensive. Particularly, a very long time is required in computing the lead angle by a micro-computer, in case that a micro-computer is used in the system.

As mentioned above, in the stepping motor controller disclosed in the prior art 1 in which the lead angle control is made, it is necessary to experimentally survey motor characteristics beforehand in order to make the control of the stepping motor comply with the stepping motor to be controlled.

In the stepping motor driver disclosed in the prior art 2, it is necessary to detect the load torque current, the computing of the lead angle is complicated and the system for computing the lead angle is expensive, since the lead angle γ is adjusted according to the changes in the load torque, that is, the q-axis current $i_q$ in the equation (1).

SUMMARY OF THE INVENTION

It is an object of the present invention to solve the above mentioned problems and to provide a stepping motor driver for which it is not necessary to survey and know motor characteristics beforehand, for which it is not necessary to detect load torque current, the system construction of which is simple and low in price, and that is capable of realizing a stable control of a stepping motor to a high speed region.

According to a preferred embodiment of the present invention to achieve the above object, a stepping motor driver for controlling a phase of a voltage applied to the motor with reference to a rotational angle of a rotor comprises:

an angle computing means that receives rotor position detection signals from a rotor position detection means and calculates a detected angle representing the rotational angle of the rotor; and a lead angle control means that generates a corrected command angle based on the difference between a command angle given from outside and the detected angle, wherein the lead angle control means calculates an angle deviation that is the difference between the command angle and the detected angle, compares the angle deviation with a predetermined value, outputs the command angle as the corrected command angle if the angle deviation is less than the predetermined value, and outputs a value obtained by adding an approximated lead angle to the detected angle as the corrected command angle if the angle deviation is greater than, or equal to, the predetermined value, and the phase of the voltage applied to the motor is controlled according to the corrected command angle.

In the stepping motor driver according to the preferred embodiment of the present invention, the lead angle control means calculates the angle deviation that is the difference between the command angle and the detected angle, compares the angle deviation with the predetermined value, outputs the command angle as it is as the corrected command angle when the angle deviation is less than the predetermined value, and outputs a value obtained by adding the approximated lead angle to the detected angle as the corrected command angle when the angle deviation is greater than or equal to the predetermined value. Accordingly, the proper lead angle for the stepping motor can be determined by a simple operation and the phase of the applied voltage can be controlled. Thus, the stepping motor driver for which it is not necessary to survey and know motor characteristics beforehand, for which it is not necessary to detect the load torque current, the system construction of which is simple and low in price, and that is capable of realizing a stable control of the stepping motor to a high speed region can be provided.

DETAILED DESCRIPTION OF THE INVENTION

Figure 1:
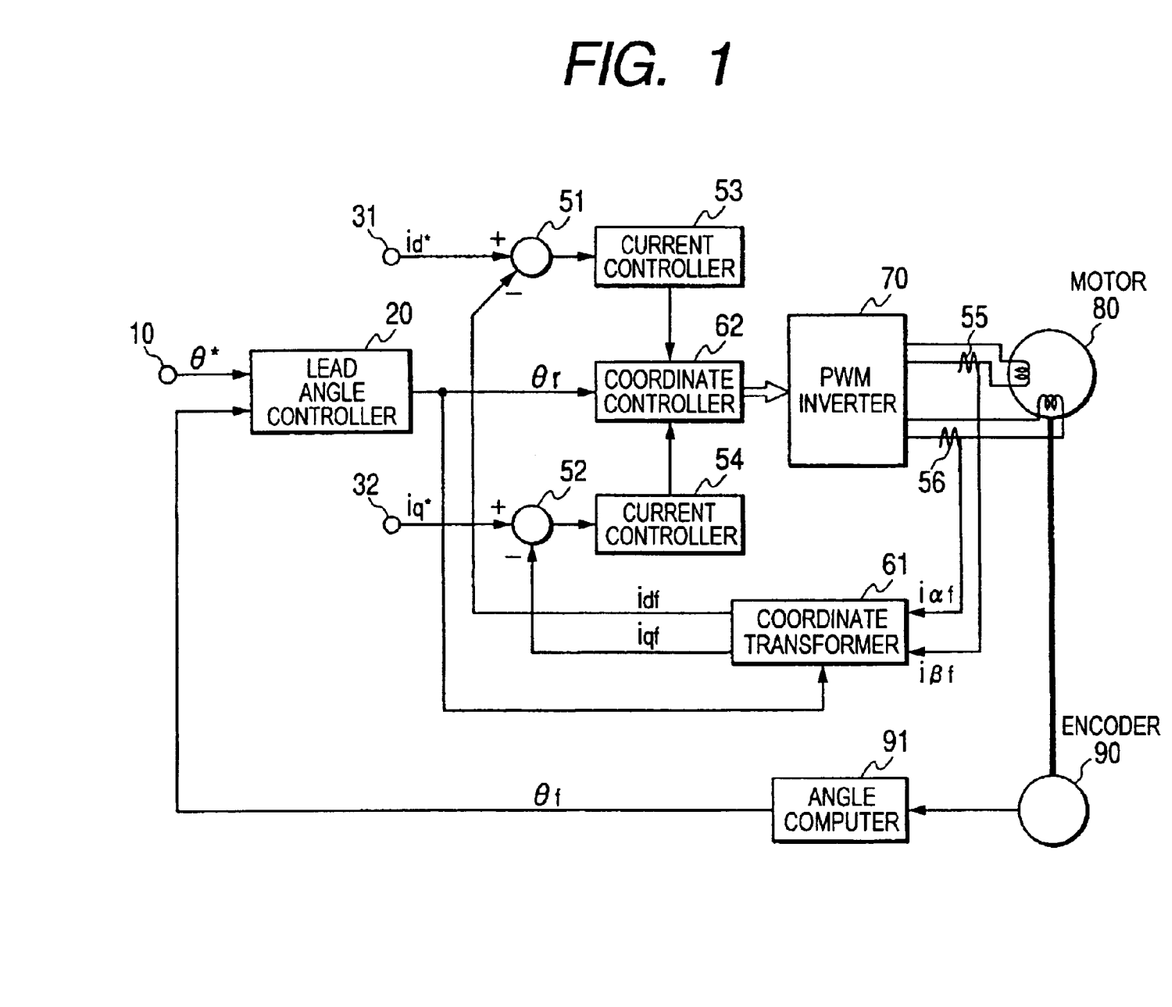
FIG. 1 is a block diagram showing a stepping motor driver according to a preferred embodiment of the present invention.

FIG. 1 is a block diagram showing a stepping motor driver according to a preferred embodiment of the present invention.

A stepping motor 80 shown in the drawing is rotated being applied voltages to its motor windings by a PWM inverter 70.

Winding current values $i_{\alpha f}$, $i_{\beta f}$ of the stepping motor 80 in an α–β fixed coordinate system are detected by current detectors 55, 56, which are current detection means, and are transmitted to a first coordinate transformer 61, which is a first coordinate transformation means.

An angle computing element 91, which is an angle computing means, receives a rotor position detection signal concerning a position of the rotor (not shown) of the stepping motor 80 from an encoder 90, which is a rotor position detection means, and calculates a detected angle $\theta_f$ representing a rotational angle position of the rotor.

The first coordinate transformer 61 transforms the winding current values $i_{\alpha f}$, $i_{\beta f}$ in the α–β fixed coordinate system into a d-axis winding current value $i_{df}$ and a q-axis winding current value $i_{qf}$ in a d-q rotational coordinate system.

On the other hand, a d-axis command current value $i_d^*$ and a q-axis command current value $i_q^*$ are applied respectively to a d-axis current command input terminal 31 and a q-axis current command input terminal 32.

A subtractor 51 receives the d-axis command current value $i_d^*$ and the d-axis winding current value $i_{df}$ and calculates a d-axis current deviation that is the difference between the d-axis command current value $i_d^*$ and the d-axis winding current value $i_{df}$.

A current controller 53, which is a current control means, amplifies the d-axis current deviation, and transmits the amplified d-axis current deviation to a second coordinate transformer 62, which is a second transformer means.

Similarly, a subtractor 52 receives the q-axis command current value $i_q^*$ and the q-axis winding current value $i_{qf}$ and calculates a q-axis current deviation that is the difference between the q-axis command current value $i_q^*$ and the q-axis winding current value $i_{qf}$.

Also a current controller 54, which is another current control means, amplifies the q-axis current deviation, and transmits the amplified q-axis current deviation to the second coordinate transformer 62.

The second coordinate transformer 62 transforms the amplified d-axis current deviation and the amplified q-axis current deviation in the d-q rotational coordinate system into values in the α-β fixed coordinate system, and transmits them to the PWM inverter 70 as current control signals in the α-β fixed coordinate system.

The PWM inverter 70 generates voltages according to the current control signals in the α-β fixed coordinate system and feeds them to the motor windings.

A lead angle controller 20, which is a lead angle control means, generates a corrected command angle $\theta_r$ based on an angle deviation δ that is the difference between a command angle $\theta^*$ given from the outside and the detected angle $\theta_f$ representing a rotational angular position of the rotor. The details of the lead angle controller 20 will be explained later.

The first coordinate transformer 61 performs coordinate transformation from the α-β fixed coordinate system into the d-q rotational coordinate system using the corrected command angle $\theta_r$ transmitted from the lead angle controller. Also, the second coordinate transformer 62 performs coordinate transformation from the d-q rotational coordinate system into the α-β fixed coordinate system also using the corrected command angle $\theta_r$.

Accordingly, the phase of the voltage applied to the motor is controlled according to the corrected command angle $\theta_r$.

Figure 2A:
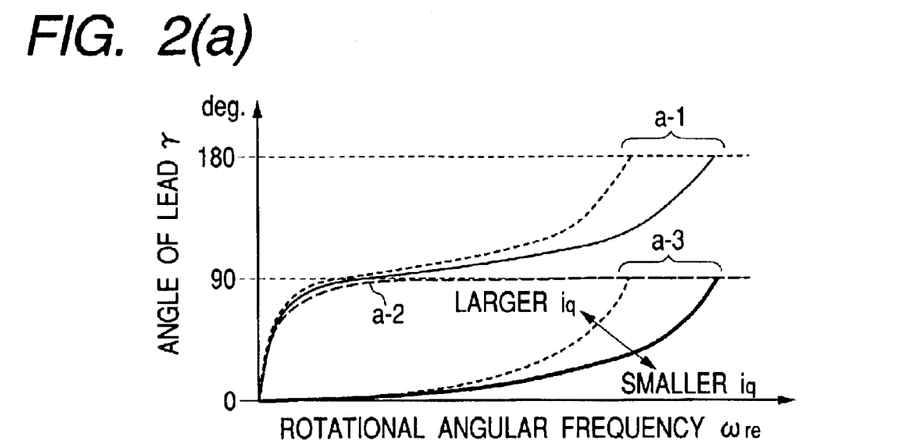
FIG. 2 is a graph showing the relation between rotational angular frequency $\omega_{re}$ of a motor and lead angle γ.

FIG. 2 is a graph showing the relation between rotational angular frequency $\omega_{re}$ of a motor and lead angle γ, given by the equation (1). In the FIG. 2(a), a-1 shows the sum of values of the first term and the second term of the equation (1), a-2 shows the value of the first term of the equation (1) and a-3 shows the value of the second term of the equation (1).

The first term of the equation (1) is a phase angle concerning an impedance of the motor and gradually approaches 90° with the increase in the rotational angular frequency $\omega_{re}$ of the motor. The second term of the equation (1) changes with the rotational angular frequency $\omega_{re}$ and the variation in q-axis current (load torque current) $i_q$ of the motor.

As commonly known, a torque T generated in a motor, when the excitation current of the motor is constant, can be approximated by an equation (17) as follows.

$$T = T_m \sin \delta \quad (17)$$

where $T_m$ is the maximum static torque and δ is a load angle. The load angle δ corresponds to the angle deviation that is the difference between the command angle $\theta^*$ and the detected angle $\theta_f$ when the d-axis is taken as the reference axis.

When the rotational angular frequency $\omega_{re}$ is relatively small and the angle deviation (or load angle) δ is also small, the motor torque can be recognized to be generated according to the equation (17). Accordingly, the lead angle control is not required when the angle deviation δ is less than a predetermined value, and the command angle $\theta^*$ is used as it is as the phase of the voltage applied to the motor. For example, 90° is used as the predetermined value.

When the angle deviation δ is equal to, or greater than, the predetermined value, value of the first term of the equation (1) approaches gradually to a constant. Accordingly, a constant is used as the first approximation for the first term of the equation (1). 90° or a value close to 90° is preferable to be used as the constant, considering the characteristics of the trigonometric function.

Figure 2B:
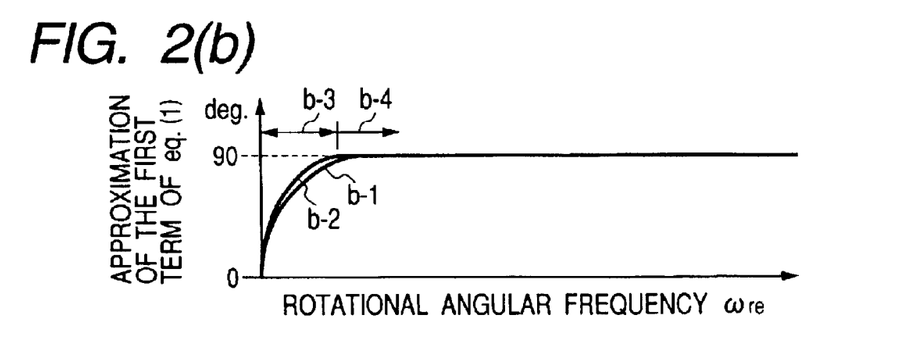

FIG. 2(b) is a graph showing the relation between values of the first term of the equation (1) and the rotational angular frequency $\omega_{re}$ of the motor. In the graph, b-1 shows the exact values of the first term, b-2 shows the values of the command angle $\theta^*$ used in substitution for the first term, b-3 shows the region where the first term is substituted by the command angle $\theta^*$, and b-4 shows the region where the first term is approximated by the constant.

The second term of the equation (1) may be approximated, as the first approximation, by a linear equation of the rotational angular frequency $\omega_{re}$ of the motor, that is, the rotational angular frequency $\omega_{re}$ multiplied by an appropriate factor can be practically used as the values of the second term. The value of the rotational angular frequency $\omega_{re}$ multiplied by the appropriate factor is called a speed compensation value.

Further, as shown in FIG. 2(a), the second term of the equation (1) changes with the rotational angular frequency $\omega_{re}$ and variation in the q-axis current (load torque current) $i_q$. Slope of the change in the value of the second term increases rapidly with the increases of the rotational angular frequency $\omega_{re}$ and the q-axis current (load torque current) $i_q$. The relation between the generated torque T and the angle deviation δ is as shown by the equation (17), the torque and the load angle (angle deviation) δ change with a same sign when δ≦90°, and the angle deviation δ can be expressed by arc sine of torque T. Accordingly, a value obtained by multiplying the angle deviation δ by the rotational angular frequency $\omega_{re}$, and then, by an appropriate factor, is added to the above value of the first approximation of the second term of the equation (1), to reflect the change in the value of the second term by the rotational angular frequency $\omega_{re}$ and the q-axis current (load torque current) $i_q$. Thus, further correction of the lead angle for variation in load can be made. The value obtained by multiplying the angle deviation δ by the rotational angular frequency $\omega_{re}$, and then, by the appropriate factor, is called a deviation compensation value.

Figure 2C:
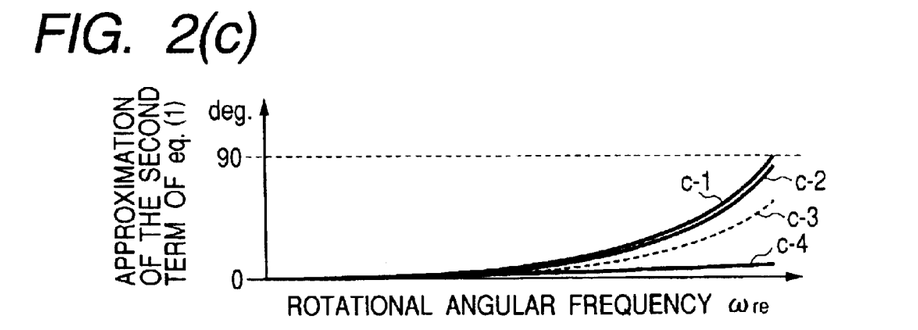

FIG. 2(c) is a graph showing the relation between the second term of the equation (1) and the rotational angular frequency $\omega_{re}$ of the rotor. In the graph, c-1 shows the exact values of the second term of the equation (1), c-2 shows the sum of the speed compensation value and the deviation compensation value, c-3 shows the deviation compensation value, and c-4 shows the speed compensation value.

Figure 3:
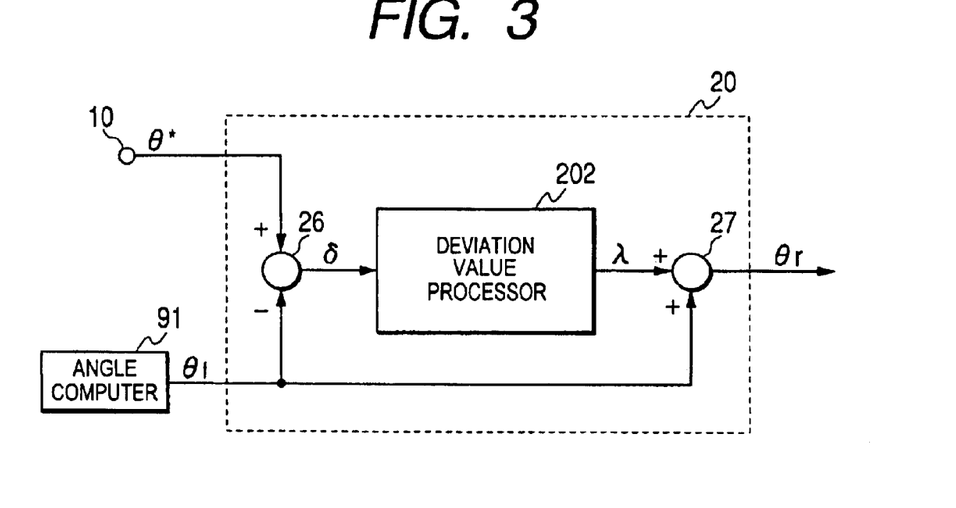
FIG. 3 is a block diagram showing a lead angle controller of the stepping motor driver according to a first embodiment of the present invention.

FIG. 3 is a block diagram showing a lead angle controller 20 of the stepping motor driver according to a first embodiment of the present invention. The lead angle controller 20 shown in the drawing comprises a subtractor 26, a deviation value processing part 202, and an adder 27.

The subtractor 26 subtracts the detected angle $\theta_f$ that is an output of the angle computing element 91 from the command angle $\theta^*$ given on an angle command input terminal 10, and outputs the angle deviation δ.

The deviation value processing part 202 compares the angle deviation δ with a predetermined value $\theta_{ref}$, 90° in electrical angle for example, outputs the angle deviation δ as an output λ if the angle deviation δ is less than the predetermined value $\theta_{ref}$, and outputs a fixed value, 90° for example, if the angle deviation δ is greater than, or equal to, the predetermined value $\theta_{ref}$.

The adder 27 adds the detected angle $\theta_f$ to the output λ of the deviation value processing part 202 and outputs the corrected command angle $\theta_r$.

Thus, the lead angle controller 20 according to the first embodiment outputs the command angle $\theta^*$ as it is as the corrected command angle $\theta_r$, if the angle deviation δ is less than the predetermined value $\theta_{ref}$, whereas the lead angle controller 20 outputs a value obtained by adding the fixed value as an approximated lead angle to the detected angle $\theta_f$, as the corrected command angle $\theta_r$, if the angle deviation δ is greater than, or equal to, the predetermined value $\theta_{ref}$.

Figure 4:
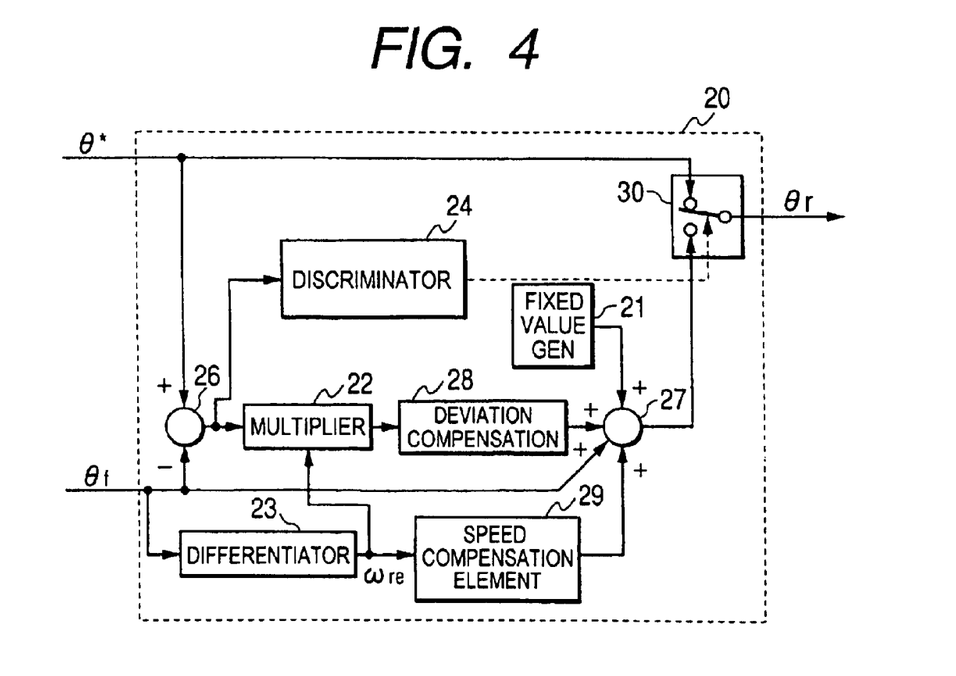
FIG. 4 is a block diagram showing a lead angle controller of the stepping motor driver according to a second embodiment of the present invention.

FIG. 4 is a block diagram showing a lead angle controller 20 of the stepping motor driver according to a second embodiment of the present invention.

A subtractor 26 shown in FIG. 4, subtracts the detected angle $\theta_f$ from the command angle $\theta^*$ to calculate the angle deviation $\delta$.

A discriminator 24 generates a switching signal depending on the angle deviation $\delta$ (electrical angle) being less than a predetermined value, 90° for example, or being greater than, or equal to, the predetermined value.

A change over switch 30 connects a switch to a command angle $\theta^*$ side to outputs the command angle $\theta^*$ as it is as the corrected command angle $\theta_r$ when the angle deviation $\delta$ is less than the predetermined value according to the switching signal.

The change over switch 30 connects the switch to an adder 27 side to outputs the corrected command angle $\theta_r$ for conducting the lead angle control when the angle deviation $\delta$ is greater than, or equal to, the predetermined value according to the switching signal.

A differentiator 23 differentiates the detected angle $\theta_f$ to obtain the rotational angular frequency $\omega_{re}$ of the rotor.

A speed compensation element 29 multiplies the rotational angular frequency $\omega_{re}$ by a predetermined factor $k_\omega$ to obtain the speed compensation value.

A multiplier 22 multiplies the angle deviation $\delta$ by the rotational angular frequency $\omega_{re}$.

A deviation compensation element 28 multiplies the output of the multiplier 22 by a factor $k_R$ to obtain the deviation compensation value.

The adder 27 adds the detected angle $\theta_f$, a fixed value (90° for example) provided by a fixed value generator 21, the speed compensation value and the deviation compensation value, and outputs the corrected command angle $\theta_r$ when the angle deviation $\delta$ (electrical angle) is greater than, or equal to, the predetermined value. Thus, the adder 27 adds an approximated lead angle to the detected angle $\theta_f$ to outputs the corrected command angle $\theta_r$ when the angle deviation $\delta$ (electrical angle) is greater than, or equal to, the predetermined value.

Figure 5:
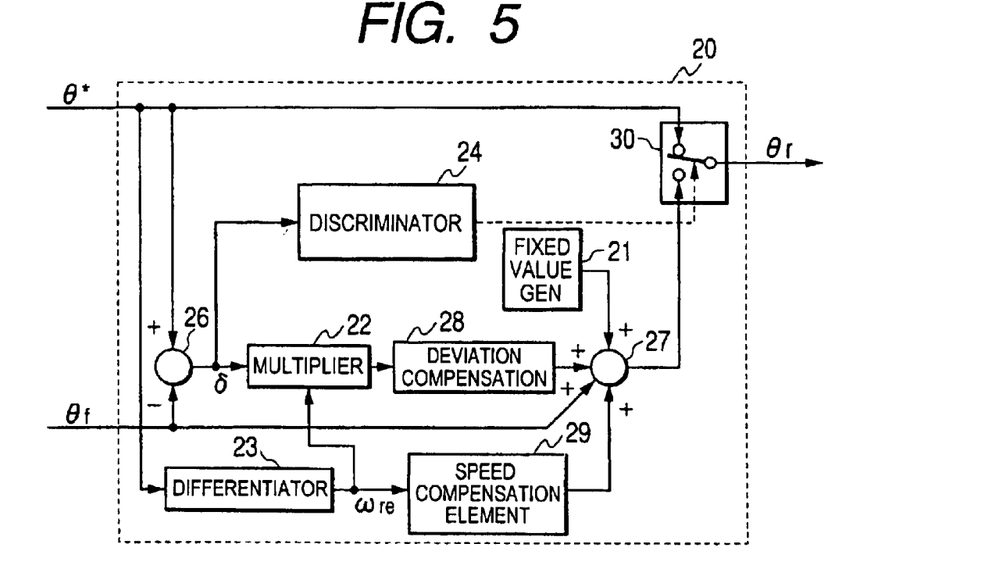
FIG. 5 is a block diagram showing a lead angle controller of the stepping motor driver according to a third embodiment of the present invention.

FIG. 5 is a block diagram showing a lead angle controller 20 of the stepping motor driver according to a third embodiment of the present invention.

In the lead angle controller according to the second embodiment, the detected angle $\theta_f$ is differentiated to obtain the rotational angular frequency $\omega_{re}$ of the rotor. In the lead angle controller 20 according to the third embodiment, the command angle $\theta^*$ is differentiated to obtaining the rotational angular frequency $\omega_{re}$. The lead angle controller 20 according to the third embodiment is the same to that according to the second embodiment except that the command angle $\theta^*$, instead of the detected angle $\theta_f$, is differentiated to obtaining the rotational angular frequency $\omega_{re}$. Also in this case, the lead angle control for maintaining the motor in a stable rotation without stepping-out to a high speed region can be conducted.

Figure 6:
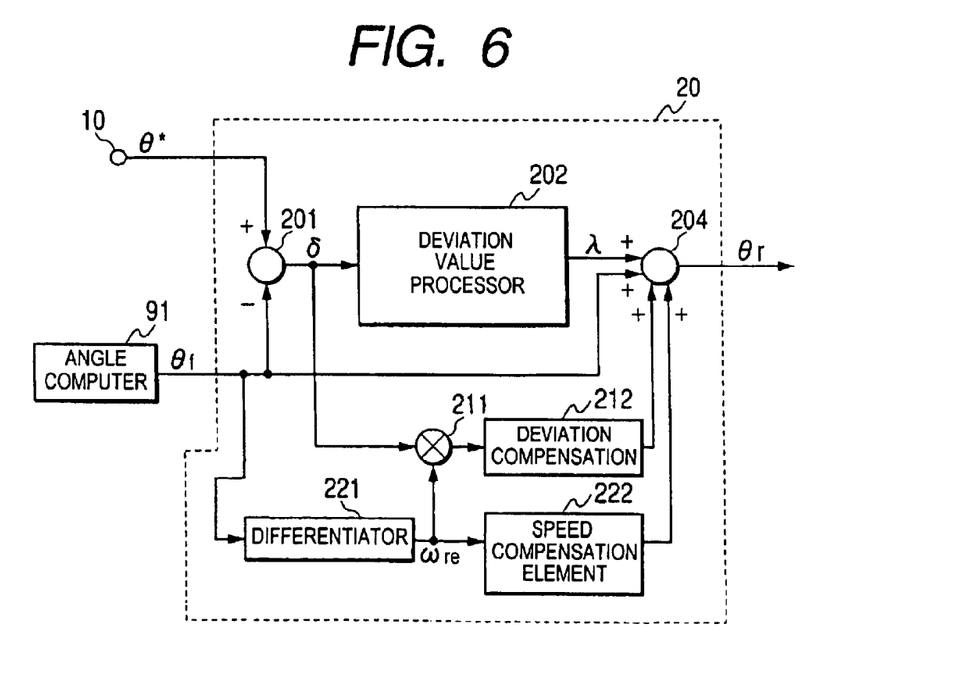
FIG. 6 is a block diagram showing a lead angle controller of the stepping motor driver according to a fourth embodiment of the present invention.

FIG. 6 is a block diagram showing a lead angle controller 20 of the stepping motor driver according to a fourth embodiment of the present invention.

In the FIG. 6, a subtractor 201 subtracts the detected angle $\theta_f$ from the command angle $\theta^*$ to obtain the angle deviation $\delta$.

A deviation value processing part 202 compares the angle deviation $\delta$ with a predetermined value $\theta_{ref}$, outputs the angle deviation $\delta$ as an output $\lambda$ if the angle deviation $\delta$ is less than the predetermined values $\theta_{ref}$, and outputs a fixed value as the output $\lambda$ if the angle deviation $\delta$ is greater than, or equal to, the predetermined value $\theta_{ref}$.

A differentiator 221 differentiates the detected angle $\theta_f$ to obtain the rotational angular frequency $\omega_{re}$ of the rotor.

A speed compensation element 222 multiplies the rotational angular frequency $\omega_{re}$ by a predetermined factor $k_\omega$ to obtain the speed compensation value.

A multiplier 211 multiplies the angle deviation $\delta$ by the rotational angular frequency $\omega_{re}$.

A deviation compensation element 212 multiplies the output of the multiplier 211 by a factor $k_R$ to obtain the deviation compensation value.

An adder 204 adds the detected angle $\theta_f$, the output $\lambda$ of the deviation value processing part 202, the speed compensation value and the deviation compensation value to output the corrected command angle $\theta_r$ when the angle deviation $\delta$ is greater than, or equal to, the predetermined value $\theta_{ref}$. Thus, the adder 204 adds an approximated lead angle to the detected angle $\theta_f$ to output the corrected command angle $\theta_r$ when the angle deviation $\delta$ is greater than or, equal to, the predetermined value $\theta_{ref}$.

Additionally, when the angle deviation $\delta$ is less than the predetermined value $\theta_{ref}$, the corrected command angle $\theta_r$ is substantially equal to the sum of the angle deviation $\delta$ and the detected angle $\theta_f$, that is, the command angle $\theta^*$, since both the speed compensation value and the deviation compensation value are small.

When the angle deviation $\delta$ is greater than, or equal to, the predetermined value $\theta_{ref}$, the value of the corrected command angle $\theta_r$ is the sum of the detected angle $\theta_f$, the fixed value, the value obtained by multiplying the rotational angular frequency $\omega_{re}$ of the rotor by the factor $k_\omega$, and the value obtained by multiplying the angle deviation $\delta$ by the rotational angular frequency $\omega_{re}$, and then, by the factor $k_R$, since the output $\lambda$ of the deviation value processing part 202 is the fixed value.

Thus, the lead angle controller 20 according to the fourth embodiment outputs the command angle $\theta^*$ substantially as it is as the corrected command angle $\theta_r$, when the angle deviation $\delta$ is less than the predetermined value $\theta_{ref}$. When the angle deviation $\delta$ is greater than, or equal to, the predetermined value $\theta_{ref}$, the sum of the fixed value, the value obtained by multiplying the rotational angular frequency $\omega_{re}$ of the rotor by the factor $k_\omega$, and the value obtained by multiplying the angle deviation $\delta$ by the rotational angular frequency $\omega_{re}$, and then, by the factor $k_R$, is obtained as an approximated lead angle. The approximated lead angle is added to the detected angle $\theta_f$ to obtain the corrected command angle $\theta_r$ that the lead angle controller 20 outputs.

Figure 7:
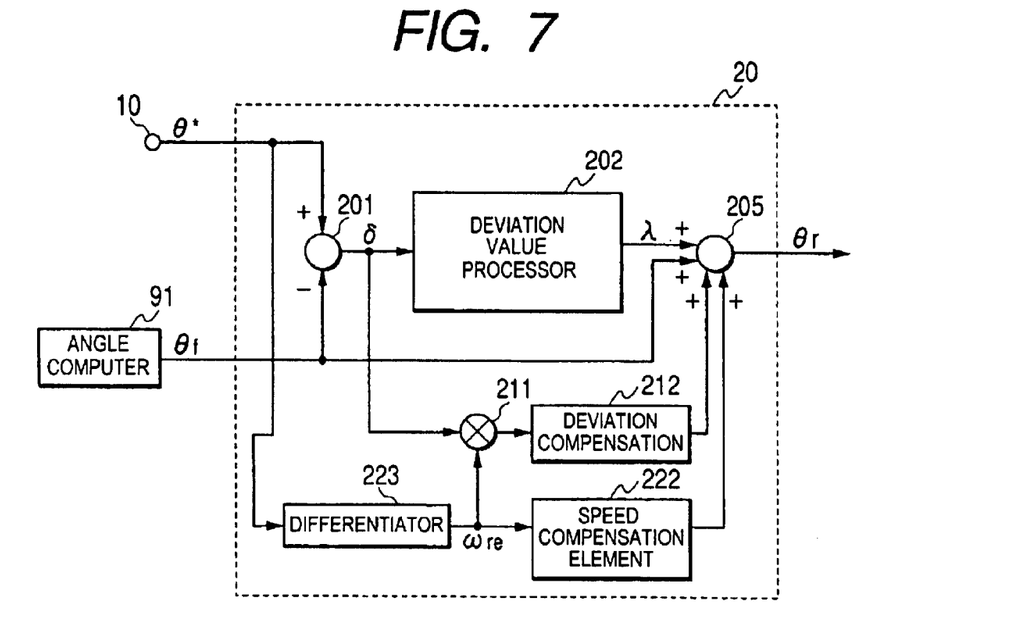
FIG. 7 is a block diagram showing a lead angle controller of the stepping motor driver according to a fifth embodiment of the present invention.

FIG. 7 is a block diagram showing a lead angle controller 20 of the stepping motor driver according to a fifth embodiment of the present invention.

In the lead angle controller 20 according to the fourth embodiment, the detected angle $\theta_f$ is differentiated to obtain the rotational angular frequency $\omega_{re}$ of the rotor. In the lead angle controller 20 according to the fifth embodiment, the command angle $\theta^*$ is differentiated by a differentiator 223 to obtain the rotational angular frequency $\omega_{re}$. The lead angle controller 20 according to the fifth embodiment is the same to the lead angle controller 20 according to the fourth embodiment except that the command angle $\theta^*$, instead of the detected angle $\theta_f$, is differentiated to obtaining the rotational angular frequency $\omega_{re}$. Also in this case, the lead angle control for maintaining the motor in a stable rotation without stepping-out to a high speed region can be conducted.

By the stepping motor driver according to any one of the embodiments of the present invention as explained above, rotation of a stepping motor can be maintained to a high speed region, without stepping-out, in conformity with variations in speed and load torque.

Further, since the stepping motor driver according to any one of the embodiments of the present invention is such one that controls the phase of the voltage applied to the stepping motor, controllers for position and speed are not required. Accordingly, the number of elements to be adjusted in the stepping motor driver is less than that in the conventional AC servomotor.

Additionally, the encoder is used to detect the rotational angular position of the rotor in the stepping motor driver according to the preferred embodiment of the present invention, sensors such as resolvers with similar performance may also be used in stead of the encoder. Sensors not directly connected to an axis of a motor can also be used.

Further, the current control is conducted using the current detectors in the stepping motor driver according to the preferred embodiment of the present invention, the present invention is also applicable to a motor driver of a voltage driven system.

Further, although explanations are made for a 2-phase stepping motor in the embodiments explained above, the present invention is also applicable to a polyphase stepping motor.

Further, the lead angle control means can be composed of a microprocessor.

In the stepping motor driver according to any one of the embodiments of the present invention, the lead angle controller calculates the angle deviation $\delta$ that is the difference between the command angle $\theta^*$ and the detected angle $\theta_f$, compares the angle deviation $\delta$ with the predetermined value $\theta_{ref}$, outputs the command angle $\theta^*$ as it is as the corrected command angle $\theta_r$, when the angle deviation $\delta$ is less than the predetermined value $\theta_{ref}$, and outputs a value obtained by adding the approximated lead angle to the detected angle $\theta_f$ as the corrected command angle $\theta_r$, when the angle deviation $\delta$ is greater than, or equal to, the predetermined value. Accordingly, the proper lead angle for the stepping motor can be determined by a simple operation and the phase of the applied voltage can be controlled. Thus, the stepping motor driver for which it is not necessary to survey and know motor characteristics beforehand, for which it is not necessary to detect the load torque current, the system construction of which is simple and low in price, and which is capable of realizing a stable control of the stepping motor to a high speed region can be provided.

In the case that the fixed value is used as the approximated lead angle, the stepping motor driver of which the system construction is more simple and lower in price, and yet which is capable of realizing a stable control of the stepping motor to a high speed region can be provided.

In the case that the sum of the fixed value, the value obtained by multiplying the rotational angular frequency $\omega_{re}$ of the rotor by the factor $k_\omega$, and the value obtained by multiplying the angle deviation $\delta$ by the rotational angular frequency $\omega_{re}$, and then, by the factor $k_R$, is used as the approximated lead angle, the stepping motor driver capable of performing lead angle control of higher accuracy can be provided.

In the case that the value obtained by differentiating the detected angle $\theta_f$ detected by the angle computing element is used as the rotational angular frequency $\omega_{re}$, it is not necessary to provide a device for detecting the rotational angular frequency $\omega_{re}$ or rotational speed of the rotor.

In case that the value obtained by differentiating the command angle $\theta^*$ is used as the rotational angular frequency $\omega_{re}$, more stable control of the stepping motor less influenced by vibration of the motor can be made.

Further, in case that calculations in the stepping motor driver according to the present invention are processed by a computer software, a high functional, and accordingly expensive, CPU is not required, and the lead angle control can be conducted by a processor of a low price, since the processing is simple and easy.

What is claimed is:

1. A stepping motor driver for controlling a phase of a voltage applied to the motor with reference to a rotational angle of a rotor comprising:

an angle computing means that receives rotor position detection signals from a rotor position detection means and calculates a detected angle representing said rotational angle of said rotor; and a lead angle controller that generates a corrected command angle based on the difference between a command angle given from outside and said detected angle, wherein said lead angle controller includes means for calculating an angle deviation that is the difference between said command angle and said detected angle, means for comparing said angle deviation with a predetermined value, means for outputting said command angle as said corrected command angle if said angle deviation is less than said predetermined value, and for outputting a value obtained by adding an approximated lead angle to said detected angle as said corrected command angle if said angle deviation is greater than, or equal to, said predetermined value, and wherein said phase of said voltage applied to the motor is controlled according to said corrected command angle.

2. The stepping motor driver according to claim 1, wherein a fixed value is used as said approximated lead angle.

3. The stepping motor driver according to claim 1, wherein the sum of a fixed value, a value obtained by multiplying a rotational angular frequency of said rotor by a factor, and a value obtained by multiplying said angle deviation by said rotational angular frequency, and then, by another factor, is used as said approximated lead angle.

4. The stepping motor driver according to claim 3, wherein a value obtained by differentiating said detected angle is used as said rotational angular frequency.

5. The stepping motor driver according to claim 3, wherein a value obtained by differentiating said command angle is used as said rotational angular frequency.

* * * * *